Oct. 13, 1925.
H. ABRAHAM
SHINGLE STRIP CUTTER
Filed May 24, 1922
1,557,391
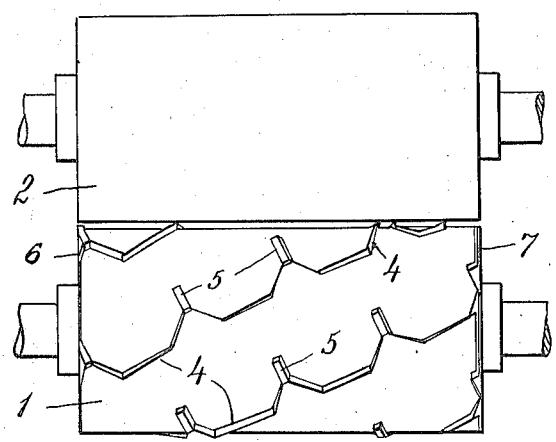
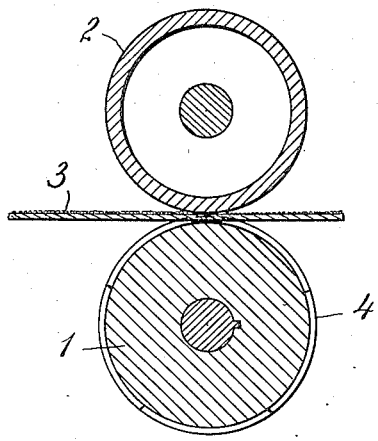
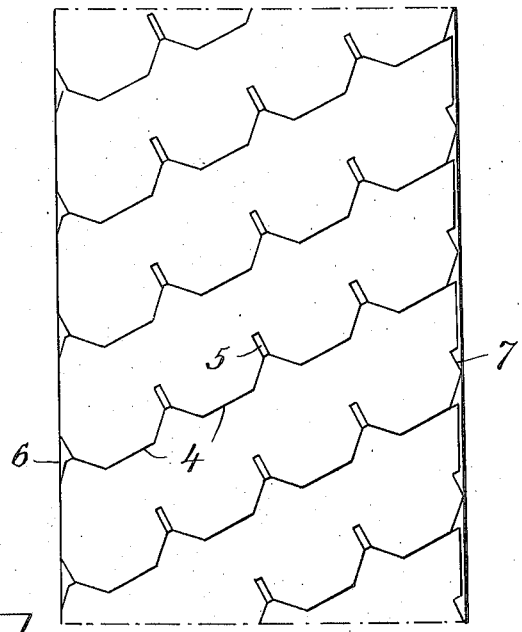
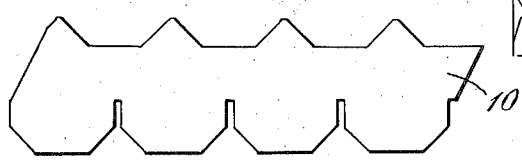
INVENTOR
HERBERT ABRAHAM
BY
ATTORNEY Patented Oct. 13, 1925.

1,557,391

UNITED STATES PATENT OFFICE.

HERBERT ABRAHAM, OF NEW YORK, N. Y., ASSIGNOR TO THE RUBEROID COMPANY, A CORPORATION OF NEW JERSEY.

SHINGLE-STRIP CUTTER.

Application filed May 24, 1922. Serial No. 563,305.

*To all whom it may concern:*

Be it known that I, HERBERT ABRAHAM, a citizen of the United States, residing in the city, county, and State of New York, have invented a certain new and useful Improvement in Shingle-Strip Cutters, of which the following is a specification.

This invention relates to a rotary cutting machine for cutting shingle-strips and more particularly to certain improvements in the cutting roll thereof.

One of the objects of the invention is to provide an improved rotary cutting machine for economically manufacturing shingle strips having spaced shingle-like portions on one longitudinal edge and spaced tabs on the other.

Another object is to provide a machine having a cutting roll whose axis extends transversely of the web and that operates to cut the web diagonally into a succession of completed shingle strips at each revolution and with but a slight waste of material.

A further object is to provide a cutting roll having a plurality of parallel series of knives or dies extending helically of its surface, each series of cutters being arranged to cut a broken line.

The machine is designed to operate on a web of prepared roofing material consisting of a foundation of felt or fibrous material, saturated and coated with bituminous substances, and generally faced with granular mineral matter, and to cut the web into shingle-strips of given shape and size. The material is somewhat difficult to cut because of the sticky or tacky nature of the bituminous saturating and coating compositions.

In the type of machine having a rotary cutter provided with a plurality of series of longitudinally extending knives, the cutter is subjected momentarily to large stress at the instant of contact of each series of knives with the web. Consequently the strain on the machine resolves itself into a succession of shocks that tend to decrease the life and efficiency of the machine, and to rapidly dull the cutters. Furthermore, in such machines the advancing edge of the web tends to stick to the knives and to wrap itself around the surface of the cutting roll.

With my improved cutter having helically arranged knives the stresses and accompanying strains are substantially constant and uniform. The helical arrangement provides a sliding cutting or shearing action on the work, in contrast with the chopping action of longitudinally arranged knives, and results in cleanly cut edges without unduly dulling the knives. Further advantages of the improvement are that the cutter assists in feeding the work, that the work will not stick to the knives, and that the product is delivered from the machine diagonally with respect to the axis of the cutter in a manner to be easily and conveniently handled.

A preferred embodiment of the improvement is illustrated in the accompanying drawings, in which:

Figure 1 is a front elevation of the rotary cutter and the bed roll.

Figure 2 is a side elevation thereof,

Figure 3 is a diagrammatic representation of the knives of the rotary cutter developed on a plane surface; and Figure 4 is a plan view of a shingle-strip produced by the machine.

Referring now to the drawings, 1 indicates a cylindrical cutting roll and 2 a cylindrical bed roll mounted one above the other with their axes extending transversely of the web 3 of prepared roofing material on which they are intended to operate. Preferably, though not necessarily, the cutting roll is mounted under the bed roll so that the cutters will penetrate through the web from below thereby avoiding initial contact with the mineral facing of the upper surface of the web, and increasing the life of the cutters. The housing and bearings of the rolls are not shown as they may be of any approved construction, and are not material to the present invention which relates particularly to improvements in the cutting roll and the manner of cutting the web.

The cutting roll carries on its surface a plurality of series of knives or dies 4, each series being arranged to cut a broken line of the configuration of the upper or lower edges of the strip 10 shown in Fig. 4, it being noted that the outline of said edges is similar except for the slots that open into the recesses of the lower edge. Adjoining the re-entrant angles or portions of each series of cutters 4 are knives or dies 5 designed to cut the slots of the completed product, the elements 5 extending at right angles to the general direction of the broken cutting line of the elements 4. The several series of cutters 4 are equally spaced in substantially parallel relation and extend helically of the circumference of the cutting roll. Knives or dies 6 and 7, extending circumferentially of the ends of the cutting roll, are provided to cut the longitudinal edges of the web 3 in the shape required to form the ends of the completed strips 10.

The arrangement and relationship of the various cutting elements, and the manner in which the cutting roll operates on the web, is diagrammatically shown in Fig. 3 which represents the cutting roll developed on a plane surface, and from which it appears that the helical arrangement of the cutters permits of cutting strips of given length from a web that is narrower than the length of the strip.

With my improved cutter a succession of strips can be cut from a web without waste of material other than that incident to the particular shape of the strip, and that due to the partly formed strips produced at the ends of the web on starting or stopping the cutting operation. As the webs are usually of considerable length the loss is negligible from a practical standpoint. In operation of the cutter the cutting elements act angularly on the web with a smooth shearing or cutting action, thereby producing cleanly cut edges without unduly dulling or straining the cutters, and tending to assist in feeding the web. The cutting roll is formed that a substantially uniform number of the cutting elements of adjacent series are acting on the web throughout each revolution of the roll, thus reducing the strain on the machine and prolonging the life of the cutter.

The shingle-strips 10 produced by the machine have oblique end edges as seen in Fig. 4. In forming a roof the strips are laid in overlapping courses with the strips of each course abutting endwise to provide oblique joints between the contiguous ones. The laid roof will simulate individual shingles and will be substantially similar to a roof formed with the strips of my reissue Patent No. 15,280, of Feb. 7, 1922, original Patent No. 1,326,899, of Jan. 6, 1920.

Obviously, various modifications may be made in the relation of the cutters depending upon the configuration of the desired product, without departing from the scope of the invention.

What I claim is:

1. In a shingle strip machine, a rotary cutter comprising a smooth faced cylinder, and a plurality of series of cutting dies projecting uniformly from the surface of the cylinder and arranged thereon in non-intersecting helically extending parallel lines.

2. In a shingle strip machine, a rotary cutter comprising a smooth faced cylinder having a plurality of cutting dies and slotting dies projecting uniformly from its surface, the cutting dies being arranged in helically extending parallel lines, and the slotting dies extending crosswise of the general direction of the lines of cutting dies and intersecting said lines at uniformly spaced points.

HERBERT ABRAHAM.